H. K. KRIEBEL.
DOUBLE ROW CULTIVATOR.
APPLICATION FILED JAN. 9, 1908.
929,601.
Patented July 27, 1909.
2 SHEETS—SHEET 2.
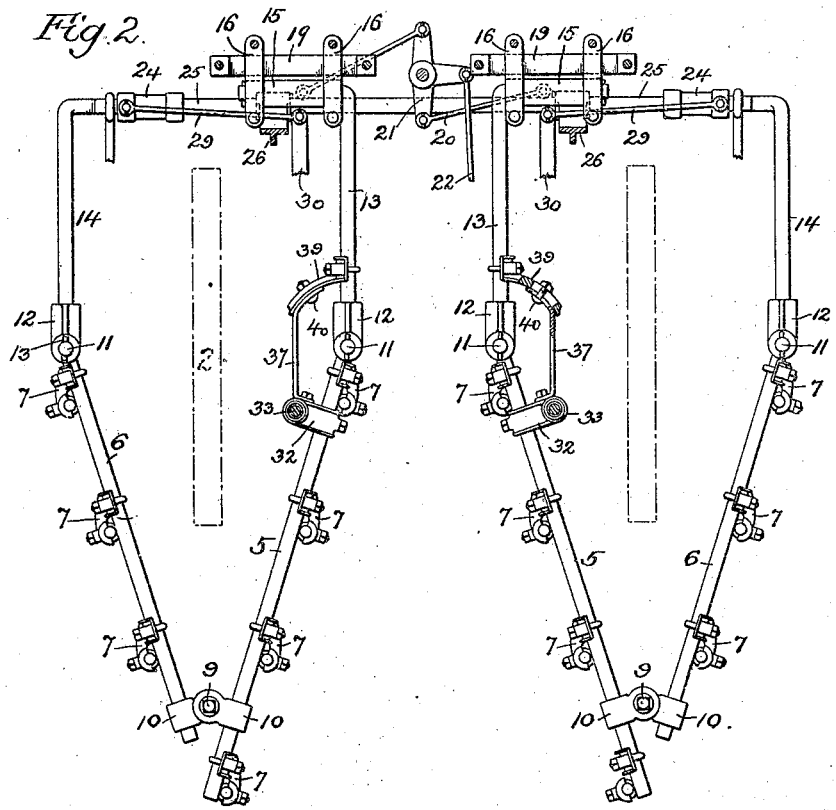
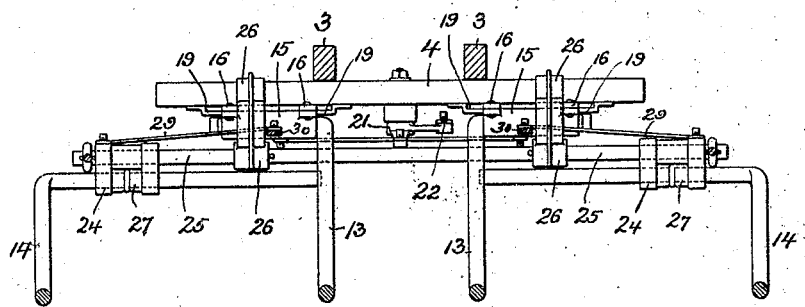

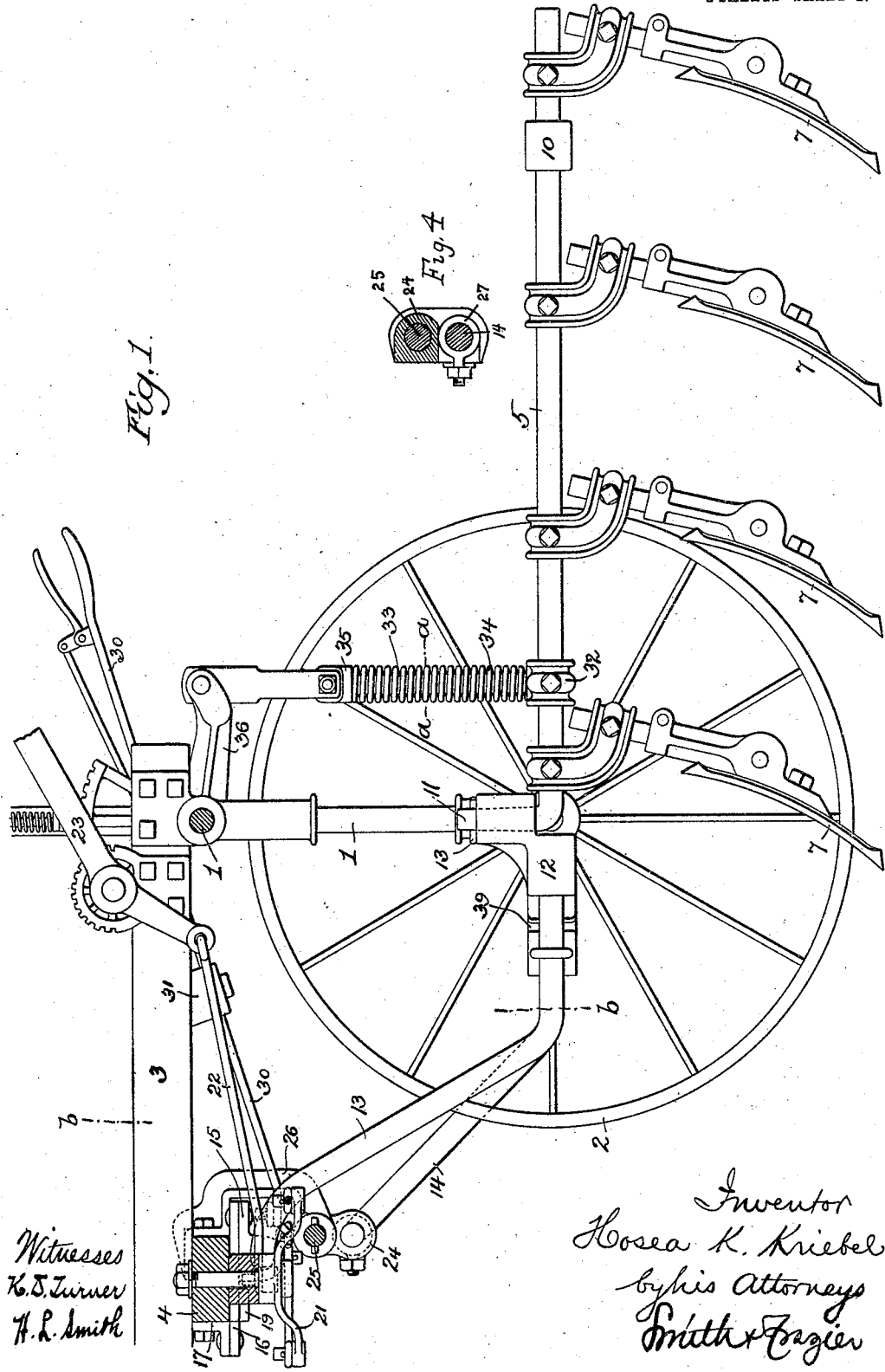

UNITED STATES PATENT OFFICE.

HOSEA K. KRIEBEL, OF PHILADELPHIA, PENNSYLVANIA, ASSIGNOR TO BATEMAN MANUFACTURING COMPANY, OF GRENLOCH, NEW JERSEY, A CORPORATION OF NEW JERSEY.

DOUBLE-ROW CULTIVATOR.

No. 929,601.        Specification of Letters Patent.        Patented July 27, 1909.

Application filed January 9, 1908. Serial No. 410,029.

*To all whom it may concern:*

Be it known that I, HOSEA K. KRIEBEL, a citizen of the United States, residing in Philadelphia, Pennsylvania, have invented certain Improvements in Double-Row Cultivators, of which the following is a specification.

My invention relates to that class of double row cultivators in which two sets of cultivator blades are employed, one set for each row, the blades of each set being mounted upon members of a pair of bars disposed in V-form, a wheel of the machine running in the forward or open end of each V, the object of my invention being to permit of the adjustment of these blade-carrying members to suit wide or narrow rows without causing any material change in the relation of the cultivator blades to one another, or to the rows of plants between which said blades operate. This object I attain in the manner hereinafter set forth, reference being had to the accompanying drawings, in which—

Figure 1 is a view, partly in longitudinal section but mainly in side elevation, showing sufficient of a double row cultivator to properly illustrate those parts of the same to which my invention particularly relates; Fig. 2 is a view, on a reduced scale and mainly in top or plan view, but with a portion shown in horizontal section on the line *a—a*, Fig. 1, and with the axle and rigid framework of the machine omitted and the wheels shown by dotted lines, Fig. 3 is a transverse section on the line *b—b*, Fig. 1, also on a reduced scale and looking toward the front end of the machine, and Fig. 4 is a sectional view, on an enlarged scale, of one of the elements of the machine.

The machine has the usual bowed or arched axle 1, carrying the supporting wheels 2 and the main draft bars 3, the latter having a transverse bar 4, upon which are mounted the devices for supporting the front portions of the structures which carry the cultivator blades. As both of these structures are substantially similar a description of one of them will suffice.

Each structure comprises two bars, each consisting of front and rear members, pivoted together, the cultivator blades 7 being mounted upon the rear members 5 and 6, of the bars and said members being disposed in V-form with the open end of the V at the front. Said rear members of the bars are pivoted together at the rear by means of a pivot pin 9 engaging brackets 10, one on each member, as shown in Fig. 2, and the member 5 has an upturned forward end 11, which is free to turn in a bearing in a bracket 12 carried by the rear end of the forward member 13 of the bar, the upturned end of the member 5 being vertically supported in said bracket by means of a pin 13ª passing through said upturned end and resting on the top of the bracket, as shown in Fig. 1, or by any other available means for effecting such support. The front end of the member 6 has a precisely similar connection with a bracket 12 at the rear end of the forward member 14, of the other bar of the pair, as shown in Fig. 2.

The front end of the member 13 is pivotally mounted in a box 15 which is bolted to the rear ends of links 16 whose front ends are pivotally connected to brackets 17 on the transverse bar 4, the links being further supported vertically by engagement with a yoke 19 which is bolted to the underside of said transverse beam 4, whereby a limited amount of lateral adjustment of the front end of the member 13 is permitted, such adjustment being effected by connection of the box 15, by means of a rod 20, to one arm of a three-armed lever 21, pivotally mounted on the underside of the beam 4, another arm of said lever having a rod 22 whereby it is connected to an adjusting lever 23 suitably mounted upon one of the longitudinal beams 3 of the machine, as shown in Fig. 1.

The forward end of the member 14 is bent inwardly and passes through a carrier 24, which is mounted so as to be free to slide laterally upon a rod 25 extending across the front of the machine and supported by hangers 26 depending from the transverse beam 4, as shown in Figs. 1 and 3, said sliding carriers having depending legs between which is confined any available form of gripping device 27, whereby the inwardly bent forward end of the member 14 can be adjusted laterally in respect to the sliding carrier and secured in any of its desired positions of adjustment, whereby two means of lateral adjustment for the member 14 are provided, the first being its lateral adjustment in respect to the sliding carrier 24 and the second the sliding movement of said carrier on the transverse rod 25. The latter movement is effected by connecting the carrier, by means of a rod 29, to the forward end of a lever 30, which is suitably pivoted to a stud 31 on the main longitudinal frame of the machine, shown in Fig. 1.

The forward portion of each of the members 5 carries a bracket 32, through which passes the lower end of a lifter rod 33, which engages the bracket by means of a transverse pin at the bottom, or in any other suitable way, in order that lifting movement of the rod 33 will always be transmitted to the member 5, while lifting movement of the latter, independently of the rod, such as might be caused by an upward thrust upon the cultivator blades, will be permitted, such movement being restrained, however, by the pressure of a coiled spring 34, which is interposed between the bracket 32 and a shoulder 35 on the lifter rod, the upper end of said rod being hung to one arm of a lever 36, whereby its vertical movements are effected.

In order to transmit the lifting strain from the member 5 to the member 13, and thereby relieve from strain the pivot pin 11 between these members and prevent the same from becoming jammed in its bearing because of such strain, the bracket 32 has secured to it a forwardly projecting arm 37, whose forward end is bent into segmental form and bears against a segmental arm 39 bolted to the member 13, the arms 37 and 39 being held in contact with each other by means of a bolt 40, but one or both of the arms being slotted so as to permit swinging movement of the member 5 in respect to the member 13 while still providing a rigid connection between the two members as regards vertical movement. By reason of this construction, the members 13 and 14 may be adjusted from or toward each other, in order to adapt the machine for cultivating rows which are wide apart or close together, each gang of cultivator blades running between a central row of plants and an outer flanking row of the same, and these lateral adjustments can be effected without materially varying the relation of the cultivator blades of each gang in respect to one another or to the pivot pin 9 constituting the pin on which the members 5 and 6 swing, the only effect of the adjustment being to narrow or widen the open end of the V presented by said members 5 and 6, and to cause a slight forward or rearward movement of the pivot pin 9.

The members of the outer bar of each pair are readily detachable by removing the rear pivot pin 9 and releasing the inwardly bent end of the forward member of the outer bar from the clamping slide 24 and the front and rear members of the inner bar of each pair can then be secured in rigid angular relation to one another by tightening the nuts on the bolts 40 whereby the machine is adapted for use as a single row cultivator.

I claim:—

1. A double row cultivator having two gangs of cultivator blades, each carried by the rear members of a pair of bars, said rear members being connected by a vertical pivot at their rear ends and having at their front ends vertical pivotal connection with rearwardly extending portions of the forward members of the bars and one of the latter members being adjustable laterally in respect to the other on the frame of the machine.

2. A double row cultivator having two gangs of cultivator blades, each carried by the rear members of a pair of bars, said rear members being connected by a vertical pivot at their rear ends, and having, at their front ends, vertical pivotal connection with rearwardly extending portions of the forward members of the bars, and one of the latter members being adjustable laterally in respect to the other on the frame of the machine, and both of said members also having horizontal pivotal connection with said frame.

3. A double row cultivator having two gangs of cultivator blades, each carried by the rear members of a pair of bars, said rear members being connected by a vertical pivot at their rear ends, and having, at their front ends, vertical pivotal connection with rearwardly extending portions of the forward members of the bars, one of the latter members being adjustable laterally in respect to the other on the frame of the machine and both of said members also having horizontal pivotal connection with said frame, the members of the innermost bar of each pair having a connection which is rigid as to vertical movement but permits horizontal swinging movement of one member in respect to the other.

4. A double row cultivator having two gangs of cultivator blades each carried by a pair of bars, the outer bar being detachable from the inner bar, and said inner bar comprising front and rear members pivoted together but provided with means whereby said members may be held in rigid angular relation to one another, and means for increasing or decreasing the extent of lateral separation of the forward ends of the pair of bars.

5. A double row cultivator having two gangs of cultivator blades, each carried by a pair of bars and each bar of the pair comprising front and rear members, the rear members having vertical pivotal connection at their rear ends and each having vertical pivotal connection at its forward end with the corresponding forward member, and the front end of the forward member of one bar of the pair being carried by a laterally adjustable slide upon the main frame of the machine and being also laterally adjustable in respect to said slide.

6. A double row cultivator comprising two gangs of cultivator blades each carried by a pair of bars and each bar of the pair comprising front and rear members, the rear members having rear pivotal connection, and each of said members having vertical pivotal connection at its forward end with a rearwardly extending portion of its corresponding forward member, the front end of each of said forward members having horizontal pivotal connection with a laterally adjustable carrier on the main frame of the machine, the outer bar of each pair being detachable from the inner bar, and the latter being provided with means whereby its front and rear members can be rigidly secured in angular relation to one another.

7. A double row cultivator comprising two gangs of cultivator blades, each carried by a pair of bars and each bar of the pair comprising front and rear members, the rear members having vertical pivotal connection at their rear ends and each of said members having vertical pivotal connection at its forward end with its corresponding forward member, the front end of each of said forward members having horizontal pivotal connection with a laterally adjustable carrier on the main frame of the machine, and the carriers for the inner bars of each pair being connected to a common lever for simultaneous adjustment.

8. A double row cultivator comprising two gangs of cultivator blades, each carried by a pair of bars and each bar of the pair comprising front and rear members, the rear members having vertical pivotal connection at their rear ends and each of said members having vertical pivotal connection at its forward end with its corresponding forward member, the front end of each of said forward members having horizontal pivotal connection with a laterally adjustable carrier on the main frame of the machine, the carriers for the inner bars of each pair being connected to a common lever for simultaneous adjustment, and the carriers for the outer bars of each pair being connected to independent levers for independent adjustment.

9. A double row cultivator having two gangs of cultivator blades, each carried by a pair of bars and each bar of the pair comprising front and rear members, the rear members having vertical pivotal connection at their rear ends, and each of said rear members having vertical pivotal connection at its forward end with its corresponding forward member, the forward ends of the inner bars of each pair having horizontal pivotal connection with a carrier hung to the rear ends of a pair of links which have pivotal connection at their forward ends with a bracket on a cross bar constituting part of the main frame of the machine.

10. A double row cultivator having two gangs of cultivator blades, each carried by a pair of bars and each bar of the pair comprising front and rear members, the rear members having vertical pivotal connection at their rear ends, and each of said rear members having vertical pivotal connection at its forward end with its corresponding forward member, the forward ends of the inner bars of each pair having horizotal pivotal connection with a carrier hung to the rear ends of a pair of links which have pivotal connection at their forward ends with a bracket on a cross bar constituting part of the main frame of the machine, and said links being supported upon a yoke secured to the underside of said transverse beam.

11. A double row cultivator having two gangs of cultivator blades, each carried by a pair of bars and each bar of the pair comprising front and rear members, the rear members having vertical pivotal connection at their rear ends and each of said members having vertical pivotal connection at its forward end with its corresponding forward member, the front end of the forward member of the outer bar of each pair being connected to a carrier which can slide laterally upon a transverse rod suspended by means of hangers from a transverse beam constituting part of the fixed frame of the machine.

12. A double row cultivator having two gangs of cultivator blades, each carried by a pair of bars and each bar of the pair comprising front and rear members, the rear members having vertical pivotal connection at their rear ends and each of said members having vertical pivotal connection at its forward end with its corresponding forward member, the front end of the forward member of the outer bar of each pair being connected to a carrier which can slide laterally upon a transverse rod suspended by means of hangers from a transverse beam constituting part of the fixed frame of the machine, and said outer bar being also susceptible of lateral adjustment in respect to said carrier.

In testimony whereof, I have signed my name to this specification, in the presence of two subscribing witnesses.

HOSEA K. KRIEBEL.

Witnesses:
HAMILTON D. TURNER,
KATE A. BEADLE.